(12) United States Patent
Kao et al.

(10) Patent No.: US 8,904,359 B2
(45) Date of Patent: Dec. 2, 2014

(54) ON-DEMAND MONITORING OF MEMORY USAGE

(75) Inventors: I-Lung Kao, Round Rock, TX (US); Frances L. Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1343 days.

(21) Appl. No.: 12/043,279

(22) Filed: Mar. 6, 2008

(65) Prior Publication Data

US 2009/0228870 A1    Sep. 10, 2009

(51) Int. Cl.
*G06F 9/44*    (2006.01)
*G06F 21/55*    (2013.01)

(52) U.S. Cl.
CPC .................... *G06F 21/556* (2013.01)
USPC ............ 717/127; 717/128; 717/130; 717/151

(58) Field of Classification Search
None
See application file for complete search history.

(56) References Cited

U.S. PATENT DOCUMENTS

| | | | | |
|---|---|---|---|---|
| 5,842,019 A * | 11/1998 | Kolawa et al. | ................ | 717/130 |
| 6,523,141 B1 * | 2/2003 | Cantrill | ............................ | 714/48 |
| 6,560,773 B1 * | 5/2003 | Alexander et al. | ............ | 717/128 |
| 6,658,652 B1 * | 12/2003 | Alexander et al. | ............ | 717/128 |
| 6,721,941 B1 | 4/2004 | Morshed et al. | | |
| 6,973,487 B2 * | 12/2005 | Kimura | ......................... | 709/221 |
| 7,313,661 B1 * | 12/2007 | Dmitriev | ....................... | 711/159 |
| 7,577,943 B2 * | 8/2009 | Chilimbi et al. | ............ | 717/130 |
| 7,827,538 B2 * | 11/2010 | Trotter | .......................... | 717/127 |
| 7,908,591 B1 * | 3/2011 | Nell et al. | ...................... | 717/130 |
| 8,037,477 B2 * | 10/2011 | Findeisen et al. | ............. | 718/104 |
| 2004/0172579 A1 * | 9/2004 | Fu | ................................ | 714/47 |
| 2005/0071460 A1 | 3/2005 | Mitchell et al. | | |
| 2005/0076184 A1 * | 4/2005 | Schumacher | ................. | 711/170 |
| 2005/0114844 A1 * | 5/2005 | Betancourt et al. | ........... | 717/128 |
| 2005/0204342 A1 * | 9/2005 | Broussard | ..................... | 717/124 |
| 2006/0095427 A1 * | 5/2006 | Dickenson | ......................... | 707/6 |
| 2006/0212852 A1 * | 9/2006 | Hwang | ......................... | 717/127 |
| 2006/0277440 A1 * | 12/2006 | Minshall et al. | ................ | 714/38 |
| 2007/0011216 A1 * | 1/2007 | Doi et al. | ..................... | 707/206 |
| 2008/0065842 A1 * | 3/2008 | Dahlstedt et al. | ............. | 711/159 |
| 2008/0294936 A1 * | 11/2008 | Hogstrom et al. | ................ | 714/8 |

OTHER PUBLICATIONS

Chung, "Monitoring and Managing Java SE 6 Platform Applications," 2006.*
Schouten, "Monitor Your Applications with JConsole—Part 2," 2007.*
Chung, "Using JConsole to Monitor Applications", 2004.*
Mandy Chung, Using JConsole to monitor applications, SUN Developer Network Site, Dec. 2004, SUN Microsystems.

* cited by examiner

*Primary Examiner* — Lewis A Bullock, Jr.
*Assistant Examiner* — Christine Dang
(74) *Attorney, Agent, or Firm* — Garg Law Firm, PLLC; Rakesh Garg; Parashos Kalaitzis

(57) ABSTRACT

A method, system, and computer usable program product for on-demand monitoring of memory usage are provided in the illustrative embodiments. An indication of a memory leak in an application is detected where the application is operating in a data processing system and using a memory associated with the data processing system. An instruction to begin monitoring a memory usage of the application is received responsive to the detection. Responsive to receiving the instruction to begin, the memory usage of the application is monitored. An instruction to dump a data related to the monitoring is received and the data is dumped. An instruction to end the monitoring is received and the monitoring is ended. The detecting, the beginning, the dumping, and the ending may occur while the application remains in operation and while the application uses the memory. The memory leak is confirmed using the data.

17 Claims, 4 Drawing Sheets

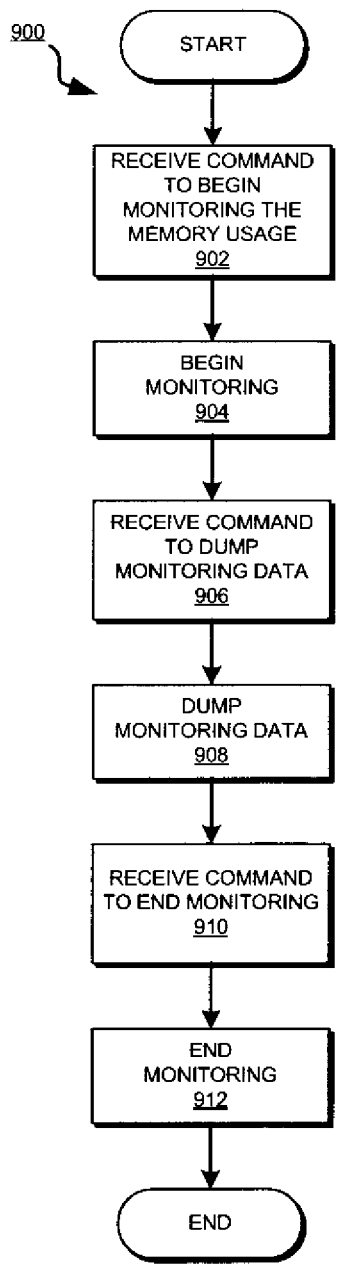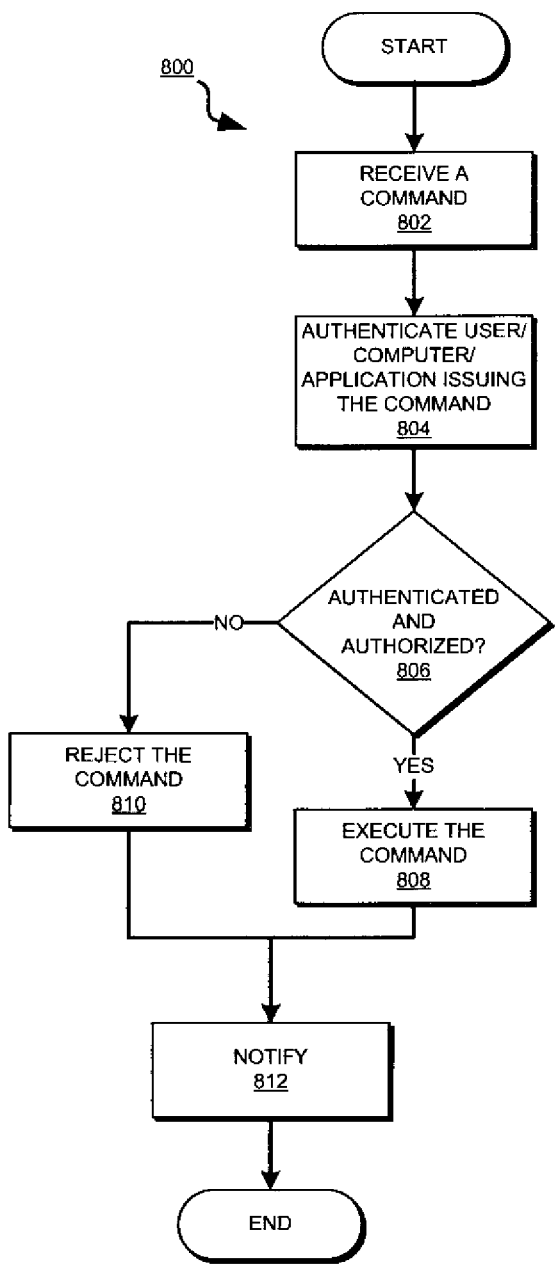

ON-DEMAND MONITORING OF MEMORY USAGE

BACKGROUND OF THE INVENTION

1. Field of the Invention

The present invention relates generally to an improved data processing system, and in particular, to a computer implemented method for managing data processing systems. Still more particularly, the present invention relates to a computer implemented method, system, and computer usable program code for on-demand monitoring of memory usage by an application in a data processing system.

2. Description of the Related Art

Software applications executing in a data processing system use memory associated with that data processing system. For example, an application uses the memory for storing instructions needed to execute the application's intended functions, data needed by those instructions, results of computations, and temporary information relevant to the execution of the application.

Generally, applications do not reserve all the memory space at once the application anticipates using over the course of the application's execution. Applications request and reserve an amount of memory when they have a need for the memory space. This process of requesting and reserving an amount of memory space is called memory allocation. Generally, a memory management system in the data processing system allocates memory space to a requesting application. The memory management system is generally a memory management functional unit of the operating system operating the data processing system.

Once an application does not need an allocated memory space, the application frees the memory space. The memory management system then deallocates the freed memory space for use by other applications. The process of deallocating memory in this manner is called memory deallocation.

Ideally, an application should eventually free all the memory that was allocated to the application. However, many applications fail to free some segments of memory spaces that are allocated to the application at some time in their execution. Failing to free memory that was allocated to an application and that the application does not need anymore is called a memory leak. Memory leak is an undesirable characteristic in an application, and software designers take great pains to ensure that the application does not have a memory leak problem.

Memory leak in an application executing on a data processing system can deteriorate the overall performance of the data processing system over time. In such cases, the memory management system allocates an amount of memory space to the application, and the application frees only a part of that memory. Over a period of time, this cycle of allocating memory and freeing less than the amount that was allocated causes a net reduction in memory resources that are available for allocating to other applications in the data processing system. The reduction in memory resources causes applications to perform slower, degrading the overall performance of the data processing system.

SUMMARY OF THE INVENTION

The illustrative embodiments provide a method, system, and computer usable program product for on-demand monitoring of memory usage. An indication of a memory leak in an application is detected where the application is operating in a data processing system and using a memory associated with the data processing system. An instruction to begin monitoring a memory usage of the application is received responsive to the detection. Responsive to receiving the instruction to begin, the memory usage of the application is monitored. An instruction to dump a data related to the monitoring is received. The data is dumped responsive to receiving the instruction to dump. An instruction to end the monitoring is received. The monitoring is ended, responsive to receiving the instruction to end. The detecting, the beginning, the dumping, and the ending may occur while the application remains in operation and while the application uses the memory. The memory leak is confirmed using the data.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 8 depicts a flowchart of a process of instructing a memory monitoring program in accordance with an illustrative embodiment; and FIG. 9 depicts a flowchart of a process of on-demand monitoring of memory usage in accordance with an illustrative embodiment.

DETAILED DESCRIPTION OF THE PREFERRED EMBODIMENT

Figure 1:
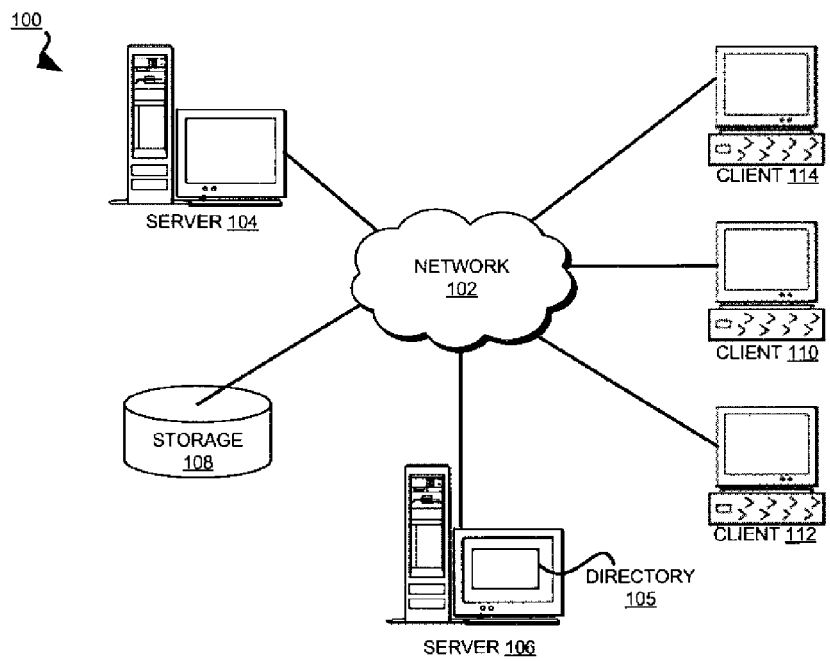
FIG. 1 depicts a pictorial representation of a network of data processing systems in which illustrative embodiments may be implemented.

Presently, when a user suspects that an application has a memory leak, the user can use a variety of commercial debugging tools that may help locate the cause of the memory leak. The illustrative embodiments recognize that even with the debugging tools, locating the cause of the memory leak is a cumbersome and sometimes unacceptable process. For example, some debugging tools require that the suspect application be shutdown and restarted in conjunction with the debugging tool. In a business-critical data processing environment, shutting down an application or a data processing system may be an unacceptable step in the debugging process.

As another example, some debugging tools require that the suspect application be re-linked or some time even recompiled in conjunction with the debugging tool's libraries so that the debugging tool may detect the source of the memory leak.

Again, the illustrative embodiments recognize, in a high-traffic or business critical data processing environment, re-linking the tool library or recompiling the source code may be unacceptable. Furthermore, for commercially procured applications that may be suspected of having a memory leak, the debugging tool's library or the application source code may simply be unavailable to the user without extensive licensing agreement, ruling out the recompilation or re-linking option in most cases.

Additionally, most debugging tools are intrusive by their very nature. The illustrative embodiments recognize that even if a debugging tool is not as disruptive as in the above examples, a user may not allow debugging tools to be installed on their data processing systems, especially in production environments where only business-purposed software may be installed and run.

Because of these and other similar problems, debugging a suspect application for a memory leak is not a desirable solution to memory leaks. In many cases, therefore, technical support providers and software designers attempt to recreate the memory leak problem in their labs by carefully collect as much circumstantial information from the data processing environment where the suspect application may be executing, and replicating those circumstances in a laboratory setup.

The illustrative embodiments recognize that replicating a tricky problem like a memory leak is labor intensive and is often inconclusive. Even when a team is able to replicate the problem and locate the source of the memory leak, the exercise often takes a long time resulting in unacceptable disruption in the user's business.

To address these and other problems related to memory leaks, the illustrative embodiments provide a method, system, and computer usable program product for on-demand monitoring of memory usage by an application in a data processing system. The illustrative embodiments may be used in conjunction with any application that may have a potential for a memory leak in the present or future version of the application.

For example, the illustrative embodiments may be implemented with a directory server, a name server, a user location service server (ULS server), an application server, a web server, a proxy server, a mail server, a feed server, or any other type of data server. The illustrative embodiments may also be implemented with any business application, such as, for example, a word processing application, a graphics application, a spreadsheet application, accounting software, a gaming application, or any other type of business application. The illustrative embodiments may also be implemented in conjunction with enterprise software, such as a manufacturing application, a planning application, a relationship management application, and a middleware application or platform. Additionally, the illustrative embodiments may be implemented in conjunction with a hardware component, such as in a firmware, as embedded software in a hardware device, or in any other suitable hardware or software form.

Any advantages listed herein are only exemplary and are not intended to be limiting on the illustrative embodiments. Additional advantages may be realized by specific illustrative embodiments. Furthermore, a particular illustrative embodiment may have some, all, or none of the advantages listed above.

Figure 2:
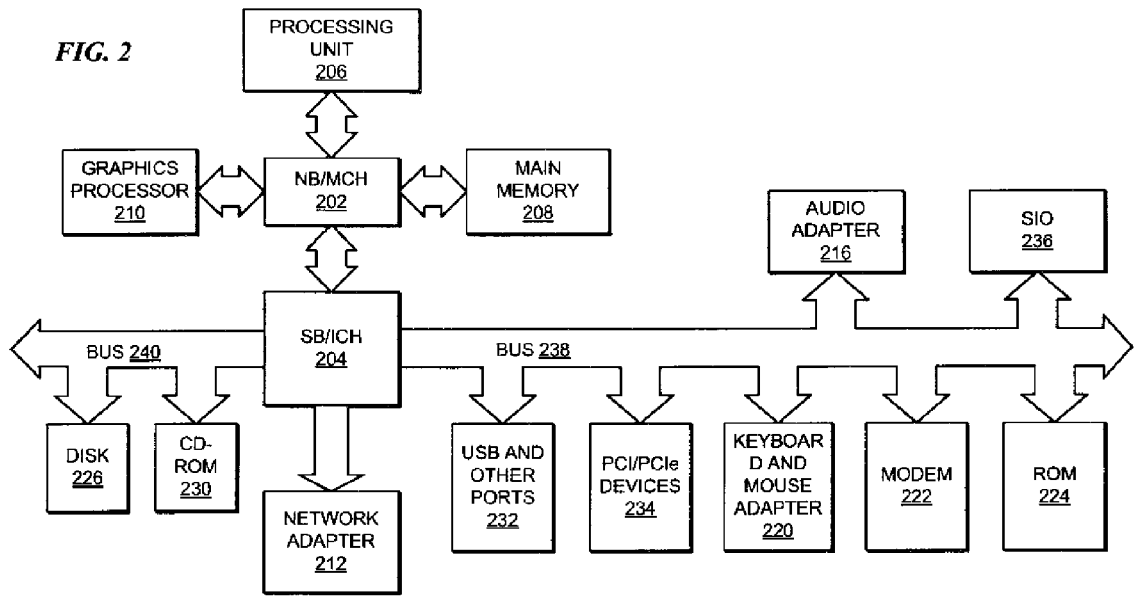
FIG. 2 depicts a block diagram of a data processing system in which illustrative embodiments may be implemented.

With reference to the figures and in particular with reference to FIGS. 1 and 2, these figures are exemplary diagrams of data processing environments in which illustrative embodiments may be implemented. FIGS. 1 and 2 are only exemplary and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Software applications may execute on any computer in data processing environment 100. Server 104 and server 106 couple to network 102 along with storage unit 108. In the depicted example, server 106 includes directory 105, which may be an exemplary software application executing on server 106, in conjunction with which the illustrative embodiments may be implemented. In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
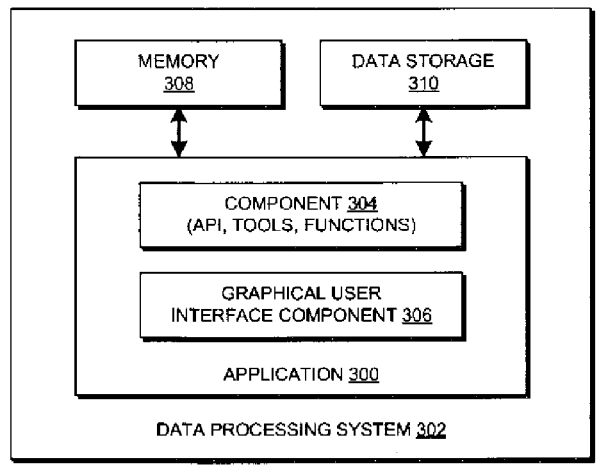
FIG. 3 depicts a block diagram of an application using memory in accordance with an illustrative embodiment.

With reference to FIG. 3, this figure depicts a block diagram of an application using memory in accordance with an illustrative embodiment. Application 300 is an exemplary application executing in data processing system 302. Directory 105 in FIG. 1 is an example of application 300. Data processing system 302 may be implemented using server 106 in FIG. 1.

Application 300 may include component 304, which may include application programming interface (API), tools, toolkits, functions, and other features of application 300 that a user may use for interacting with application 300. For example, application 300 may include a set of APIs that may allow a user to extend the functionality of application 300 by adding code to the code of application 300. For example, if application 300 were a directory server, component 304 of the directory server may be used to create an extended operation that may perform certain custom functions with respect to the directory server.

Application 300 may also include graphical user interface (GUI) component 306 that may allow a user to interact with application 300 using a graphical user interface, such as with a web browser.

Memory 308 may be associated with data processing system 302. Memory 308 may be implemented using main memory 208 in FIG. 2. Application 300 may use memory 308 for performing the functions of application 300 as well as any functions that may be added to application 300 using component 304. A memory management system associated with data processing system 302 may allocate memory space from memory 308 to application 300, and application 300 may free an allocated memory space in memory 308 when not using such memory space. If application 300 has a memory leak, application 300 may not free a portion of the memory space in memory 308 that may be allocated to application 300.

Application 300 may also have access to data storage 310. Data storage 310 may be another data storage, such as a hard disk, a flash drive, additional random access memory (RAM), RAM elsewhere in the data processing system, a network storage, tape medium, CD-ROM, CD-RAM, or any other form of data storage suitable for a particular implementation. Application 300 may use space in data storage 310 to save data, such as user information, log files, and code.

Figure 4:
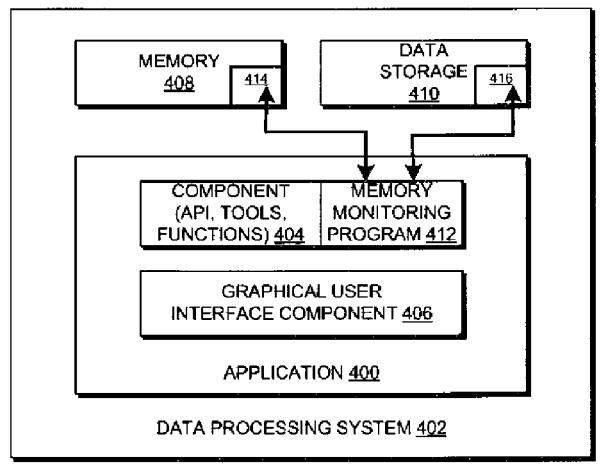
FIG. 4 depicts a block diagram of on-demand monitoring of memory usage in accordance with an illustrative embodiment.

With reference to FIG. 4, this figure depicts a block diagram of on-demand monitoring of memory usage in accordance with an illustrative embodiment. Application 400 is an exemplary application executing in data processing system 402. Application 400 may be analogous to application 300 in FIG. 3. Data processing system 402 may be implemented using data processing system 302 in FIG. 3.

Component 404 including APIs, tools, and functions for application 400, and graphical user interface component 406 correspond to component 304 and graphical user interface component 306 in FIG. 3. Application 400 interacts with memory 408 and data storage 410 in a manner analogous to application 300's interaction with memory 308 and data storage 310 in FIG. 3.

Memory monitoring program 412 according to the illustrative embodiment includes a function that monitors the memory being allocated to application 400 and being freed by application 400. In one embodiment, memory monitoring program 412 may be implemented as a software application that may be associated with application 400 using APIs in component 404. For example, if application 400 were a directory server, memory monitoring program 412 may be an extended operation associated with the directory server. A user may trigger the extended operation on-demand during the execution of the directory server. On-demand triggering is the turning on, turning off, or otherwise controlling a function, such as memory monitoring program 412, as and when a user or a system desires.

In another embodiment, memory monitoring program 412 may include code that may be separate from but may be executed on-demand with respect to application 400. For example, memory monitoring program 412 may be a software application that application 400 may be able to trigger during the execution of application 400 as determined by logic within application 400, memory monitoring program 412, or both. In such an embodiment, memory monitoring program 412 as software application may be integrated with, or separate from, application 400.

As an example, a user may trigger memory monitoring program 412 into operation, such as by sending a command to memory monitoring program 412 to turn on memory usage monitoring, when the user suspects a memory leak. As another example, application 400 may itself trigger memory monitoring program 412, when certain logic in application 400 detects a memory leak in application 400. As another example, data processing system 402 may trigger memory monitoring program 412 when certain logic executing in data processing system 402 suspects a memory leak. As another example, logic within memory monitoring program 412 may identify an indicator of a memory leak and trigger the on-demand monitoring.

For example, a logic executing in a data processing system may determine that an amount of memory allocated to an application is increasing over time, triggering the suspicion of a memory leak. As another example, a logic in a data processing system may determine that the overall performance of the data processing system deteriorates over a period of time when an application executes over that period of time. As another example, a logic in an application may determine that the performance of the application deteriorates over a period of time when the application executes over that period of time. As another example, a logic in the memory monitoring program may determine that an associated application has an amount of memory allocated to the application that the application has not used for a preset period of time.

As another example, a logic in a data processing system, an application, or a memory monitoring program according to the illustrative embodiments may measure a rate of the growth of the allocated memory and suspect a memory leak if the rate exceeds a certain threshold value. As another example, a similarly situated logic may trigger a mechanism for freeing allocated but unused memory, called garbage collection, in conjunction with measuring a rate of growth of allocated memory, and measure a drop in the amount of allocated memory after garbage collection. Such a logic may determine that a memory leak may exist if the amount of unused allocated memory freed after garbage collection is above a threshold value.

The methods and considerations for determining or indicating a memory leak as described above are only exemplary and not limiting on the illustrative embodiments. Many other considerations and logic configurations for determining, identifying, indicating, or suspecting a memory leak in specific implementations will be apparent from this disclosure and the same are contemplated within the scope of the illustrative embodiments. Furthermore, any logic for determining, identifying, indicating, or suspecting a memory leak may be included in a data processing system, an application, or a memory monitoring program according to the illustrative embodiments, to operate as described with respect to memory monitoring program 412.

Once the user or a system determines that sufficient monitoring of memory usage has occurred, they may trigger memory monitoring program 412 to stop. The user or a system may also trigger memory monitoring program 412 to perform another operation, such as dump the monitoring data to a file. Dumping the data is the process of recording the data, such as for example, recording in a file on hard disk, tape drive, in database, or in any other form.

Some more examples of the operations that a user or a system may trigger may be transmitting the monitoring data to another data processing system, scheduling another monitoring at a different time, or adjusting the parameters of monitoring. For example, the user or system may trigger memory monitoring program 412 to adjust the duration or frequency of monitoring the memory usage, or adjust the address space of the memory to be monitored.

In operation, memory monitoring program 412 may itself use a portion of memory 408, such as memory space 414, for maintaining the monitoring data. For example, memory monitoring program 412 may maintain a list of memory addresses allocated to application 400 in memory space 414. Memory monitoring program 412 may remove memory addresses of freed memory from such a list as application frees allocated memory space. When memory monitoring program 412 is instructed to stop the monitoring, the list of memory addresses remaining in memory space 414 may indicate the memory space that application 400 failed to free during the course of monitoring.

In operation, memory monitoring program 412 may also use a portion of data storage 410, such as storage space 416. For example, memory monitoring program 412 may periodically dump the monitoring data from memory space 414 to storage space 416 so that memory monitoring program 412 may continue monitoring. As another example, a user or system may trigger memory monitoring program 412 to dump the monitoring data to storage space 416, which may include a log file. As another example, if memory monitoring program 412 determines that an event during the monitoring may be of particular interest to a user or system, memory monitoring program 412 may write that information in storage space 416 so that another application, such as a notification application, may pick up the information and deliver to the user or system.

The operations and functions described with respect to memory monitoring program 412 are only exemplary and described here for the clarity of the illustrative embodiments. Many other operations and functions may be configured and triggered in memory monitoring program 412 without departing from the scope of the illustrative embodiments.

Figure 5:
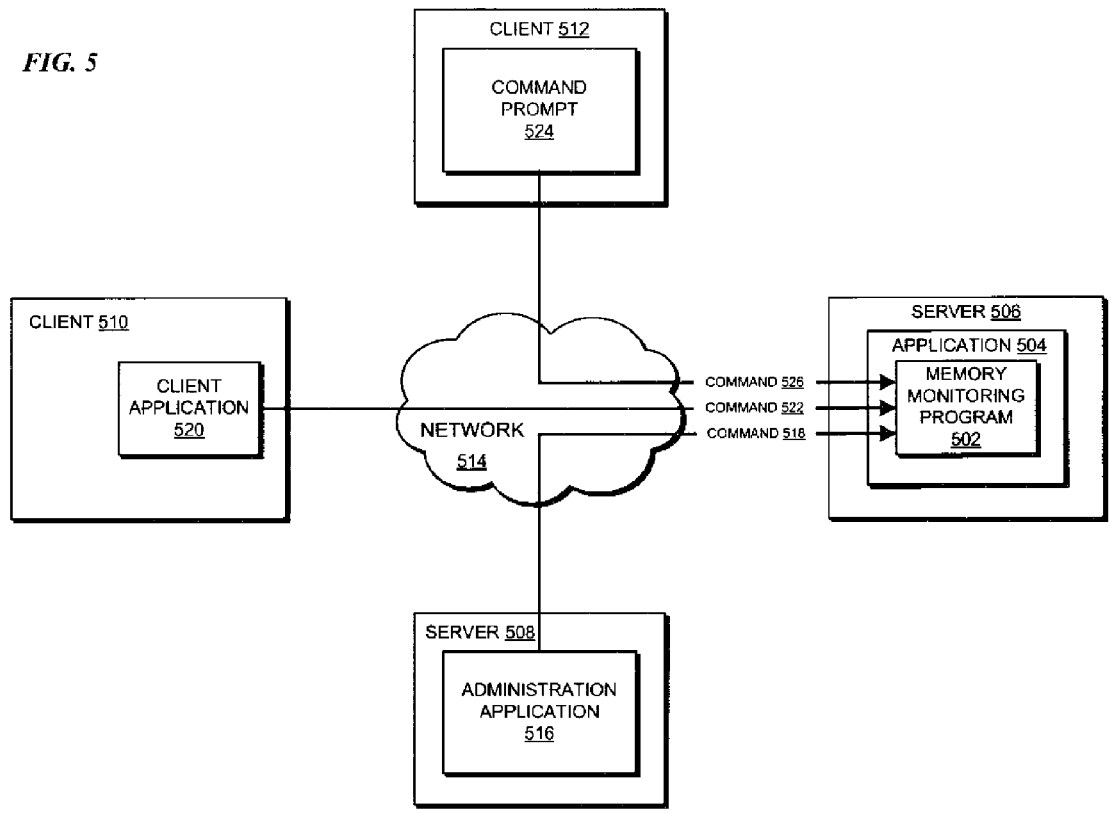
FIG. 5 depicts a block diagram of triggering a memory monitoring program in accordance with an illustrative embodiment.

With reference to FIG. 5, this figure depicts a block diagram of triggering a memory monitoring program in accordance with an illustrative embodiment. Memory monitoring program 502 may execute in association with application 504 in a data processing system, such as server 506. Memory monitoring program 502 may be similar to memory monitoring program 412 in FIG. 4. Server 506 and server 508 may be similar to server 104 and server 106 in FIG. 1. Client 510 and client 512 may each be similar to any of client 110, 112, or 114 in FIG. 1. Server 506, server 508, client 510, and client 512 may be data processing systems distributed across a data processing environment and interconnected using network 514 in the manner of FIG. 1.

Any of server 506, server 508, client 510, and client 512, or a user thereof, may trigger an operation of memory monitoring program 502 by sending a command to memory monitoring program 502. For example, administration application 516 may be a network administration application that may monitor the performance of the various data processing systems communicating over network 514. Administration application 516 may detect a degradation of the performance of server 506 and may suspect application 504 of having a memory leak. Administration application 516 may trigger an operation on memory monitoring program 504 by sending command 518 to memory monitoring program 502 over network 514. In implementing the illustrative embodiments, applications similar to administration application 516 may be made aware of the existence of a capability for on-demand monitoring of memory usage existing in memory monitoring program 502.

Alternatively, a user using client application 520 on client 510 may trigger an operation, such as on-demand monitoring of memory usage by application 504, by sending command 522 to memory monitoring program 502. The user may also send command 522, which may be a command to stop the monitoring started by command 518, or vice versa. Alternatively, a user on client 512 may use command prompt 524 to issue command 526 to trigger an operation of memory monitoring program 502.

The various commands and the methods of sending those commands to memory monitoring program 502 are described here only as exemplary. A particular implementation of the illustrative embodiments may implement these and other commands in the form described or other forms without departing from the scope of the illustrative embodiments. For example, in one embodiment, only the issuer of the command to start a memory monitoring may be allowed to stop the monitoring. In another embodiment, any authorized system, application, or user may start, stop, pause, or modify a memory monitoring operation of memory monitoring program 502.

In another embodiment, the various commands to trigger operations on memory monitoring program 502 may be issued using a command prompt, a graphical user interface, a function call, a message, or a combination thereof. Furthermore, such commands may be communicated to memory monitoring program 502 that may be located within the command issuing data processing system or across a data network.

Figure 6:
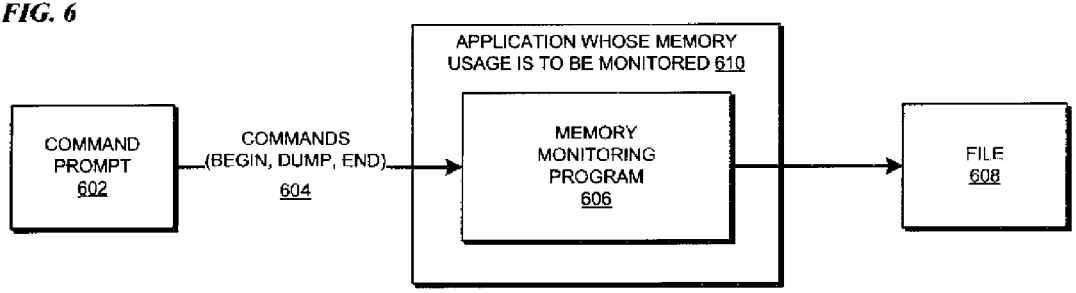
FIG. 6 depicts a block diagram of an exemplary manner of sending commands to a memory monitoring program in accordance with an illustrative embodiment.

With reference to FIG. 6, this figure depicts a block diagram of an exemplary manner of sending commands to a memory monitoring program in accordance with an illustrative embodiment. A user may use command prompt 602 to issue one or more commands 604 to memory monitoring program 606. Commands 604 may be, for example, to begin or end memory usage monitoring, or to dump the data from a monitoring session to a file, such as file 608. Memory monitoring program 606 may be associated with application 610 whose memory usage is to be monitored. For example, memory monitoring program 606 may be an extended operation of a lightweight directory access protocol (LDAP) server, which may be an exemplary application 610, whose memory usage a user wishes to monitor without disrupting the operation of the directory.

Figure 7:
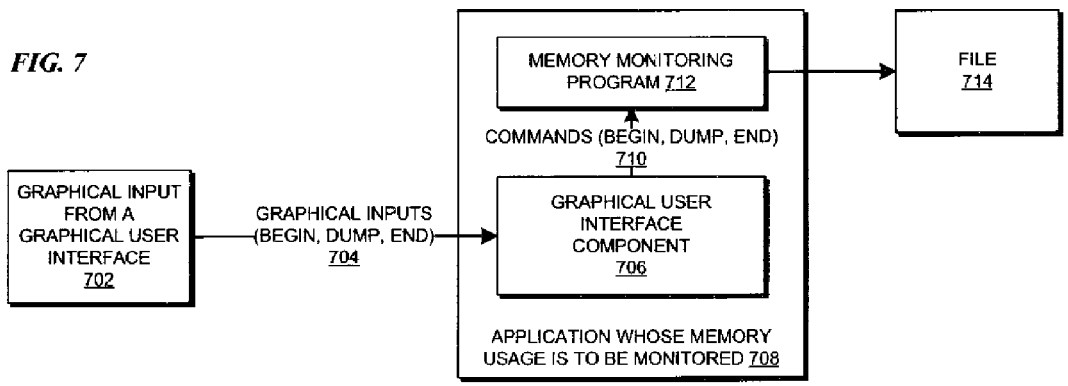
FIG. 7 depicts a block diagram of another exemplary manner of sending commands to a memory monitoring program in accordance with an illustrative embodiment.

With reference to FIG. 7, this figure depicts a block diagram of another exemplary manner of sending commands to a memory monitoring program in accordance with an illustrative embodiment. A user may use graphical user interface 702 to issue one or more graphical inputs 704 that graphical user interface component 706 associated with application 708 may receive. Application 708 may be an application whose memory usage the user wishes to monitor. Graphical user interface 706 may translate graphical inputs 704 into commands 710 and send commands 710 to memory monitoring program 712. Commands 710 may be, for example, commands to begin or end memory usage monitoring, or commands to dump the data from a monitoring session, such as to file 714 or other form of storing or communicating data. For example, a user may click a uniform resource locator (URL) link on a web page using a web browser to send graphical inputs 704, which memory monitoring program 712 receives as commands 710.

With reference to FIG. 8, this figure depicts a flowchart of a process of instructing a memory monitoring program in accordance with an illustrative embodiment. Process 800 may be implemented in a memory monitoring program, such as memory monitoring program 502 in FIG. 5, or 606 in FIG. 6, or 712 in FIG. 7.

Process 800 begins by receiving a command (step 802). Process 800 may authenticate the user, system, or application that issued the command (step 804). Process 800 determines whether the issuer of the command is authenticated (step 806). If the issuer of the command is authenticated and authorized to issue the command ("Yes" path of step 806), process 800 executes the command (step 808). If the issuer of the command is not authenticated or not authorized to execute the command ("No" path of step 806), process 800 rejects the command received in step 802 (step 810). For example, a user may be authenticated as being a valid user on a system, but the user may not be authorized to issue a particular command.

A particular implementation may omit steps 804 and 806 without departing from the scope of the illustrative embodiments. When omitting authentication and authorization steps 804 and 806, the implementation may proceed from step 802 to step 808, accepting all commands that process 800 receives in step 802.

Process 800 may notify about executing or rejecting a command (step 812). For example, process 800 may send an email to a system administrator if an unauthorized user or application attempted to start memory monitoring. As another example, process 800 may make an entry in a log file for a command that process 800 executes. Many other ways of notifying users and systems will become apparent from this disclosure. Process 800 ends thereafter.

With reference to FIG. 9, this figure depicts a flowchart of a process of on-demand monitoring of memory usage in accordance with an illustrative embodiment. Process 900 may be implemented using a memory monitoring program, such as memory monitoring program 502 in FIG. 5, or 606 in FIG. 6, or 712 in FIG. 7. Process 900 may be used in conjunction with an application when the application is suspected of having a memory leak.

Process 900 begins by receiving a command to begin monitoring the memory usage of an associated application (step 902). In one embodiment, process 900 may perform a step of determining, identifying, indicating, or suspecting a memory leak in the associated application, as exemplarily described with respect to FIG. 4. In such an embodiment, process 900 may perform step 902 upon making such a determination, identification, indication, or suspicion.

Process 900 begins monitoring the memory usage of the application (step 904). A command to begin monitoring the memory usage may include a set of other parameters, such as, for example, a time at which the monitoring should begin, or an address range that is to be monitored, or processes or threads whose memory usage is to be monitored. A set of parameters is zero or more parameters. Many other parameters may be included with the command to begin the monitoring without departing from the scope of the illustrative embodiment.

Monitoring the memory usage may include monitoring the calling stack. A command for monitoring the memory usage may include commands or parameters for monitoring the calling stack. A calling stack is a record of which functions, subroutines, or set of instructions of an application are active at a given time. An active function, subroutine, or a set of instruction is a function, subroutine, or a set of instruction that has started executing but has not finished executing. The calling stack provides information about where the program control should return when the active function, subroutine, or the set of instruction finishes executing. The memory usage monitored in this manner may give additional information about the memory that is still allocated to the application and has not been freed.

Process 900 receives a command to dump the monitoring data, for example, into a file (step 906). Process 900 dumps the monitoring data according to the command received in step 906 (step 908). A command to dump the monitoring data may include a set of additional parameters, such as, for example, when to dump the data, how much data to dump, which process' or thread's data to dump, and whether to erase the dumped data from memory. Many other parameters may be included with the command to dump the monitoring data without departing from the scope of the illustrative embodiment.

Process 900 receives a command to end monitoring the memory usage of an associated application (step 910). Process 900 ends monitoring the memory usage of the application (step 912). Process 900 ends thereafter. A command to end monitoring the memory usage may include a set of other parameters, such as, for example, a time at which the monitoring should end, or an address range for which the monitoring is to end, or processes or threads whose memory usage monitoring is to end. Many other parameters may be included with the command to end the monitoring without departing from the scope of the illustrative embodiment.

The components in the block diagrams and the steps in the flowcharts described above are described only as exemplary. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for on-demand monitoring of memory usage. By implementing the illustrative embodiments, a user may be able to monitor the memory usage of an application, or a part thereof, that the user suspects of having a memory leak. The user may monitor the memory usage for memory leaks using the illustrative embodiments without having to shutdown the all or part of the application. Users may also not need to recompile the code of the application in order to determine a cause of the memory leak.

Using the illustrative embodiments may allow the user to investigate a memory leak in running applications without interrupting business-critical operations, such as in production environments. The illustrative embodiments also allow the user to start, stop, or modify the monitoring on demand, to wit, as needed, in the actual environment in which the user suspects a memory leak. Thus, the user may not have to replicate the circumstances in a lab environment in an attempt to recreate the memory leak.

Furthermore, using the memory usage data collected by the illustrative embodiments, a user may be able to identify precisely which function, subroutine, instruction, command, operation, or step in an application's code may include the memory leak. For example, illustrative embodiments may collect the data such that the data includes an identifier of an instruction requesting memory allocation and the address of the memory allocated in response. If that allocated memory is not freed when no longer in use, the data resulting from the illustrative embodiments will provide the information that may assist a user in locating the cause of the memory leak, to wit, the instruction in this example. Used in this manner, the illustrative embodiments may provide an address of the memory not freed, a size of the memory not freed, and an identification of an instruction in the application that had allocated that memory. Thus, the illustrative embodiments may assist the user in locating or even pinpointing the cause of a memory leak in an application without having to debug the application or recreate the memory leak circumstances.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable storage device providing program code for use by or in connection with a computer or any instruction execution system. For the purposes of this description, a computer-usable or computer-readable storage device can be any tangible apparatus that can contain, or store, the program for use by or in connection with the instruction execution system, apparatus, or device.

The storage device can be an electronic, magnetic, optical, electromagnetic, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD. The terms "computer usable storage device" and "storage device" do not encompass a signal propagation medium or a transmission medium, any description in this disclosure to the contrary notwithstanding.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for monitoring memory usage, the method comprising:

detecting an indication of a memory leak in an application, the application being a directory server according to a directory access protocol and operating in a data processing system and using a memory associated with the data processing system, wherein the indication is responsive to determining that (i) a rate of growth of memory space allocated to the application exceeds a threshold rate of allocation at a first time, and (ii) an unused portion of the memory space allocated that is freed at a second time exceeds a threshold amount;

receiving, responsive to the detecting, from a client application of the directory server using an interface to a memory monitoring component in the application, an instruction to begin monitoring a memory usage of the application to invoke a first extended operation to execute monitoring on-demand in the directory server;

beginning, responsive to receiving the instruction to begin, monitoring the memory usage of the application, wherein the memory monitoring component in the application performs the monitoring;

receiving an instruction to dump a data related to the monitoring causing a second extended operation to execute on-demand in the directory server;

dumping the data, responsive to receiving the instruction to dump;

receiving an instruction to end the monitoring causing a third extended operation to execute on-demand in the directory server;

ending the monitoring, responsive to receiving the instruction to end, wherein the detecting, the beginning, the dumping, and the ending occur while the application remains in operation and while the application uses the memory; and confirming using the data the memory leak.

2. The method of claim 1, wherein the data related to the monitoring includes an identification of an instruction in a code of the application, wherein a portion of the memory usage is responsive to the instruction in the code of the application requesting memory allocation.

3. The method of claim 1, wherein the instructions to begin, dump, and end are received as commands, wherein the commands as received from a command prompt interface and a graphical user interface.

4. The method of claim 1, wherein the instruction to begin monitoring includes a set of parameters, wherein a parameter in the set of parameters provides one of a start time of the monitoring, the identification of the application to be monitored, and an address range to be monitored.

5. The method of claim 1, wherein the instruction to dump includes a set of parameters, wherein a parameter in the set of parameters provides one of a condition when to dump and a quantity of the data to dump.

6. The method of claim 1, wherein the instruction to end includes a set of parameters, wherein a parameter in the set of parameters provides one of a time to end the monitoring, an identification of the application for which the monitoring is to be ended, and an address range for which the monitoring is to be ended.

7. The method of claim 1, further comprising:

receiving an instruction to schedule one of beginning the monitoring, dumping the data, and ending the monitoring.

8. The method of claim 1, further comprising:

authenticating a sender, wherein using the client application the sender sends one of the instructions to begin the monitoring, dump the data, and end the monitoring;

determining whether the sender is authorized to send one of the instructions; and performing, responsive to the sender being authorized, a function corresponding to the one of the instructions.

9. A computer usable program product comprising a computer usable storage device including computer usable code for monitoring memory usage, the computer usable code comprising:

computer usable code for detecting an indication of a memory leak in an application, the application being a directory server according to a directory access protocol and operating in a data processing system and using a memory associated with the data processing system, wherein the indication is responsive to determining that (i) a rate of growth of memory space allocated to the application exceeds a threshold rate of allocation at a first time, and (ii) an unused portion of the memory space allocated that is freed at a second time exceeds a threshold amount;

computer usable code for receiving, responsive to the detecting, from a client application of the directory server using an interface to a memory monitoring component in the application, an instruction to begin monitoring a memory usage of the application to invoke a first extended operation to execute monitoring on-demand in the directory server;

computer usable code for beginning, responsive to receiving the instruction to begin, monitoring the memory usage of the application, wherein the memory monitoring component in the application performs the monitoring;

computer usable code for receiving an instruction to dump a data related to the monitoring causing a second extended operation to execute on-demand in the directory server;

computer usable code for dumping the data, responsive to receiving the instruction to dump;

computer usable code for receiving an instruction to end the monitoring causing a third extended operation to execute on-demand in the directory server;

computer usable code for ending the monitoring, responsive to receiving the instruction to end, wherein the detecting, the beginning, the dumping, and the ending occur while the application remains in operation and while the application uses the memory; and computer usable code for confirming using the data the memory leak.

10. The computer usable program product of claim 9, wherein the instruction to begin monitoring includes a set of parameters, wherein a parameter in the set of parameters provides one of a start time of the monitoring, the identification of the application to be monitored, and an address range to be monitored.

11. The computer usable program product of claim 9, wherein the data related to the monitoring includes an identification of an instruction in a code of the application, wherein a portion of the memory usage is responsive to the instruction in the code of the application requesting memory allocation.

12. The computer usable program product of claim 9, wherein the instruction to end includes a set of parameters, wherein a parameter in the set of parameters provides one of a time to end the monitoring, an identification of the application for which the monitoring is to be ended, and an address range for which the monitoring is to be ended.

13. The computer usable program product of claim 9, further comprising:

computer usable code for authenticating a sender, wherein using the client application the sender sends one of the instructions to begin the monitoring, dump the data, and end the monitoring;

computer usable code for determining whether the sender is authorized to send one of the instructions; and computer usable code for performing, responsive to the sender being authorized, a function corresponding to the one of the instructions.

14. A data processing system for monitoring memory usage, the data processing system comprising:

a storage device, wherein the storage device stores computer usable program code; and a processor, wherein the processor executes the computer usable program code, and wherein the computer usable program code comprises:

computer usable code for detecting an indication of a memory leak in an application, the application being a directory server according to a directory access protocol and executing in a data processing system and using a memory associated with the data processing system, wherein the indication is responsive to determining that (i) a rate of growth of memory space allocated to the application exceeds a threshold rate of allocation at a first time, and (ii) an unused portion of the memory space allocated that is freed at a second time exceeds a threshold amount;

computer usable code for receiving, responsive to the detecting, from a client application of the directory server using an interface to a memory monitoring component in the application, an instruction to begin monitoring a memory usage of the application to invoke a first extended operation to execute monitoring on-demand in the directory server;

computer usable code for beginning, responsive to receiving the instruction to begin, monitoring the memory usage of the application, wherein the memory monitoring component in the application performs the monitoring;

computer usable code for receiving an instruction to dump a data related to the monitoring causing a second extended operation to execute on-demand in the directory server;

computer usable code for dumping the data, responsive to receiving the instruction to dump;

computer usable code for receiving an instruction to end the monitoring a third extended operation to execute on-demand in the directory server;

computer usable code for ending the monitoring, responsive to receiving the instruction to end, wherein the beginning, the dumping, and the ending occur while the application is in operation and using the memory; and computer usable code for confirming using the data the memory leak.

15. The data processing system of claim 14, wherein the instruction to begin monitoring includes a set of parameters, wherein a parameter in the set of parameters provides one of a start time of the monitoring, the identification of the application to be monitored, and an address range to be monitored, wherein the instruction to dump includes a second set of parameters, wherein a parameter in the second set of parameters provides one of a condition when to dump, and a quantity of the data to dump, and wherein the instruction to end includes a third set of parameters, wherein a parameter in the third set of parameters provides one of a time to end the monitoring, an identification of the application for which the monitoring is to be ended, and an address range for which the monitoring is to be ended.

16. The data processing system of claim 14, wherein the data related to the monitoring includes an identification of an instruction in a code of the application, wherein a portion of the memory usage is responsive to the instruction in the code of the application requesting memory allocation.

17. The data processing system of claim 14, further comprising:

computer usable code for authenticating a sender, wherein using the client application the sender sends one of the instructions to begin the monitoring, dump the data, and end the monitoring;

computer usable code for determining whether the sender is authorized to send one of the instructions; and computer usable code for performing, responsive the sender being authorized, a function corresponding to the one of the instructions.

* * * * *